United States Patent [19]

Hall et al.

[11] Patent Number: 4,804,526

[45] Date of Patent: Feb. 14, 1989

[54] PROCESS FOR PURIFYING PHOSPHORIC ACID FOR ELECTRICAL SEMICONDUCTOR USE

[75] Inventors: Richard E. Hall, Trenton, N.J.; Peter H. Zeh, Fremont; Frederic B. Jueneman, Newark, both of Calif.

[73] Assignee: FMC Corporation, Philadelphia, Pa.

[21] Appl. No.: 107,329

[22] Filed: Oct. 13, 1987

[51] Int. Cl.[4] ............................................ C01B 25/16
[52] U.S. Cl. ............................................... 423/321 R
[58] Field of Search ........................... 423/319, 321 R

[56] References Cited

U.S. PATENT DOCUMENTS

| | | | |
|---|---|---|---|
| 1,597,984 | 8/1926 | La Baour | 423/321 R |
| 1,777,548 | 10/1930 | Booth | 423/321 R |
| 3,297,401 | 1/1967 | Sakomura et al. | 23/165 |
| 3,449,074 | 6/1969 | Schertzer | 23/165 |
| 4,044,108 | 8/1977 | Kikuchi et al. | 423/321 R |
| 4,279,878 | 7/1981 | Maurer et al. | 423/321 R |
| 4,294,809 | 10/1981 | Hill | 423/321 R |
| 4,503,022 | 3/1985 | Majumdar | 423/321 R |
| 4,668,492 | 5/1987 | Schimmel et al. | 423/321 R |

FOREIGN PATENT DOCUMENTS 593370 2/1934 Fed. Rep. of Germany ... 423/321 R
778810 7/1957 United Kingdom .

OTHER PUBLICATIONS

Chemical Abstracts, vol. 70, 1969, (C.A. 70:21370f), "Removal of Arsenic from Phosphoric Acid by Using Antimony Pentasulfide".
Journal of Analytical Chemistry, USSR, vol. 32 (2), pp. 223-225, "Conditions for the Formation of the Antimony(V) Orthophosphate Complex and Its Use to Mask Antimony(V) During the Coulometric Determination of Arsenic".

Primary Examiner—Gregory A. Heller
Attorney, Agent, or Firm—Frank Ianno; Eugene G. Seems

[57] ABSTRACT

Phosphoric acid is treated to remove and/or tie up heavy metals and antimony to enable the acid to be used in electrical semiconductor applications by reacting the acid with hydrogen sulfide and with hydrogen peroxide in separate treating steps. The hydrogen sulfide precipitates metal sulfides which are separated from the acid, and the hydrogen peroxide oxidizes dissolved antimony so that it is tied up and does not post-precipitate in the acid after removal of the metal sulfides.

11 Claims, No Drawings

PROCESS FOR PURIFYING PHOSPHORIC ACID FOR ELECTRICAL SEMICONDUCTOR USE

A process is provided for treating phosphoric acid to remove and/or tie up and chemically inactivate certain heavy metal impurities, and antimony, to enable such acid to be used in electrical semiconductor use.

Phosphoric acid is formed either by the acidulation of phosphate rock (wet acid process) by a mineral acid, normally sulfuric acid, or by reducing phosphorus.rock in an electric furnace with coke to liberate elemental phosphorus and burning the phosphorus to produce phosphoric acid (furnace acid process) in a second stage. The burning of the phosphorus converts it into $P_2O_5$ which forms phosphoric acid on contact with water. Phosphoric acid for electrical semiconductor ("SEMI") use is preferably produced by the furnace acid process because it yields a much purer acid product requiring less clean up than wet acid to meet the stringent requirements of semiconductor acid. In practice, the SEMI acid must be low in dissolved metals, particularly heavy metals, to avoid contaminating micro fine electrical workpieces, such as etched silicon wafers employed in memory and computer chips, and also must be free of any discernible insoluble particles, for example, larger than 0.5 microns, to avoid deposition of such insolubles which can result in the undesired bridging of adjacent electrical lines etched only microns apart on such workpieces.

One problem that has been encountered in producing SEMI phosphoric acid is that of purifying the acid so that its antimony content does not render the acid unsuitable. More specifically, SEMI phosphoric acid of 75% to 85% by weight $H_3PO_4$ is normally treated with a sulfide, typically hydrogen sulfide, to precipitate heavy metal impurities, such as arsenic, lead, mercury and also cadmium, as their sulfide salts. The acid is then filtered hot (about 60° C. to 75° C.) so that the viscosity of the acid is low enough to obtain a commercially acceptable filtration rate. The filtration removes the heavy metal sulfides as a cake, leaving the hot acid free of unacceptable solids and heavy metals.

However, antimony sulfide solubility in phosphoric acid is very temperature dependent. At 75° C., it has a solubility of about 4 ppm and at 25° C. it has a solubility of no more than about 1 ppm. Therefore, when the hot, filtered acid cools to room temperature, particles of antimony sulfide visibly precipitate out of solution because the solubility of antimony sulfide is exceeded at the lower room temperature. While the precipitated antimony sulfide amounts to only a few parts per million, such relatively large insoluble particulates cannot be tolerated and render the acid unacceptable for SEMI use. Attempts to filter the acid at lower temperatures have not been successful on a commercial scale because the much higher viscosity of the acid at such lower temperatures results in too slow a rate of filtration.

It has now been found that phosphoric acid containing heavy metals and antimony can be treated to render it acceptable for use as a SEMI grade phosphoric acid by:

(a) adding to said phosphoric acid a reagent which may be either hydrogen peroxide or hydrogen sulfide, the hydrogen peroxide, when added, being added in amounts sufficient to oxidize residual antimony dissolved in the acid, while the hydrogen sulfide, when added, being added in amounts sufficient to precipitate residual heavy metals in the acid, (b) separating any precipitate resulting from step (a), if formed, from the treated acid at a temperature of at least 60oC, (c) removing excess unreacted reagent, either hydrogen peroxide or hydrogen sulfide, from the acid, (d) adding to the resulting phosphoric acid of step (c) the remaining alternate reagent, either hydrogen peroxide or hydrogen sulfide, not employed in step (a); the hydrogen peroxide, when added, being added in amounts sufficient to oxidize residual antimony dissolved in the acid, while the hydrogen sulfide, when added, being added in amounts sufficient to precipitate residual heavy metals in the acid, (e) separating any precipitate resulting from step (d), if formed, from the treated acid at a temperature of at least 60oC, (f) removing excess unreacted reagent, either hydrogen peroxide or hydrogen sulfide from the acid, and (g) recovering a phosphoric acid whose heavy metals, antimony, and insolubles content are sufficiently low to be acceptable for electrical semiconductor use.

In carrying out the present invention, the preferred mode of operation is to utilize hydrogen sulfide as the first reagent. In this mode of operation, phosphoric acid having a concentration of from about 75% to 85% (as weight percent $H_3PO_4$) is treated initially with hydrogen sulfide. The hydrogen sulfide may be added to the acid in any convenivent form to assure uniform dispersal of the hydrogen sulfide throughout the body of phosphoric acid. This may be carried out, for example, by adding hydrogen sulfide to the acid in the mixing tank with sufficient stirring to assure dispersion of the hydrogen sulfide in the phosphoric acid throughout the tank. A preferred way of mixing the hydrogen sulfide into the phosphoric acid is to add the hydrogen sulfide into an inline static mixer along with the phosphoric acid. This assures instant dispersion of hydrogen sulfide throughout the acid while they are both being added to a holding tank. The hydrogen sulfide may be added as a gas at atmospheric or superatmospheric pressures. Enough hydrogen sulfide is added to react with the metal impurities in the acid and includes a sizable excess to assure complete precipitation of metal impurities.

The mixing may be carried out at any temperature from room temperature to any elevated temperature below the boiling point of the solution. However, for convenience, the addition of the hydrogen sulfide is normally carried out at the temperature at which the phosphoric acid has a suitable viscosity for being readily handled in unit operations in the plant. This normally is a tempera-ture of from about 60° C. to about 75° C., which is the same temperature at which the phosphoric acid is subject to filtration.

The addition of the hydrogen sulfide to the acid will cause precipitation of any heavy metal sulfides and other metal sulfides such as antimony sulfide. The sulfide precipitates are separated from the acid by filtration as, for example, conventional pressure leaf filters. To facilitate such filtration, filter aids such as diatomaceous earth may be added to the acid and the leaf filters may be subject to being precoated with filter aid prior to carrying out the filtration.

The filtration is carried out at a temperature of at least 60° C., preferably from about 60° C. to about 75° C. to assure that the phosphoric acid has a sufficiently low viscosity to enable the filtration to take place at a reasonable rate consistent with commercial practice. The use of lower temperatures, that is, below about 60° C., will generally reduce the filtration rate to an unacceptable point because of the increase in the viscosity of the acid when the temperature of the acid is lowered. Temperatures above 75° C. can be employed, but such high temperatures are normally not necessary since the acid viscosity is sufficiently low to permit acceptable filtration rates on commercial units used in the plant.

After separating the phosphoric acid from the metal sulfide insolubles, the acid is then treated to a separation step, for example, an air sparging for a sufficient amount of time to remove any excess hydrogen sulfide remaining in the solution. This is most generally carried out by pumping air through a sparge ring in the botlom of the tank containing the aoid so that it strips out excess hydrogen sulfide that may remain in solution after the filtration step. It is most important that the excess hydrogen sulfide be removed from the acid before proceeding with the next step in the process. Any excess hydrogen sulfide that remains in the phosphoric acid solution will react with the next added reagent and form insoluble sulfur which is undesired in the phosphoric acid solution.

The phosphoric acid at this point has been separated from the major amounts of metal impurities and contains only those amounts of heavy metals and other metal sulfides such as antimony which are soluble in the acid at the temperature of filtration. The next reagent that is added to the phosphoric acid is hydrogen peroxide. The addition may take place when the acid is at room temperature or hot, but preferably at the same temperature at which it is handled and filtered, namely, about 60° C. to about 75° C. The hydrogen peroxide is normally added as an aqueous solution, preferably at a concentration of about 50% to about 70% (weight percent $H_2O_2$) Lower concentrations of hydrogen peroxide may be employed but the additional water will dilute the phosphoric acid and is undesired. Higher concentrations than 50% to 70% hydrogen peroxide may also be employed if commercially available, but consideration must be given to the fact that at higher concentrations there are more stringent requirements for handling and shipping and, therefore, it is preferred to use more convenient concentrations of between 50% and 70% $H_2O_2$. The concentration of the hydrogen peroxide employed is not critical and solutions of 50% are preferred because they are readily available commercially and do not dilute the acid beyond acceptable limits.

The hydrogen peroxide may be added to the phosphoric acid in a mixing tank with stirring, or by any other convenient mixing means. The amount of hydrogen peroxide added must be sufficient to assure oxidation of any dissolved, residual antimony remaining in the phosphoric acid solution. To assure that sufficient hydrogen peroxide has been added, a sample of the treated acid can be sparged with air to remove excess hydrogen peroxide, cooled to 25° C., and treated with $H_2S$. When no antimony sulfide precipitates, the amount of hydrogen peroxide employed is sufficient.

Generally, from 40 to 150 parts per million of hydrogen peroxide (by weight) are sufficient to ensure that any residual antimony has been oxidized. The use of larger amounts of hydrogen peroxide is not deleterious since it does not interfere with the desired chemical reaction, but is wasteful since the excess hydrogen peroxide is subsequently removed from the solution. While the use of excess hydrogen peroxide is not deleterious to the process, the use of insufficient hydrogen peroxide to oxidize the remaining antimony ion is to be avoided since such unoxidized antimony can come out of solution as an undesired antimony sulfide precipitate and frustrate the purpose of the instant process.

The hydrogen peroxide is added to the phosphoric acid solution in order to react with the antimony that remains dissolved in the phosphoric acid solution. This reaction is believed to oxidize the antimony to a state in which the antimony is either tied up, complexed or otherwise chemically inactivated so that it no longer forms an insoluble antimony sulfide which can precipitate in the phosphoric acid upon cooling. The exact mechanism of the reaction of antimony with hydrogen peroxide is not known, nor is the form known in which th antimony has been rendered unreactive with sulfide. Whatever the form, whether it be the formation of a complex, whether it be tied up with other metals, or chemically inactivated toward sulfur, the result is that the antimony that remains dissolved in the phosphoric acid does not precipitate as the sulfide or in any other form from the filtered phosphoric acid on cooling. In the absence of this hydrogen peroxide treatment, fine particles of antimony sulfide will precipitate on cooling of the acid which renders the acid unsuitable for SEMI use. Additionally, if the acid is subjected to a heavy metals test in which additional hydrogen sulfide is added to the treated acid, the additional hydrogen sulfide can cause precipitation of additional antimony sulfide, in the absence of the hydrogen peroxide treatment.

The treatment of the phosphoric acid with hydrogen peroxide, as described above, does not per se produce any precipitates in the normal operation of this process. Accordingly, no filtration or other separation step is normally required at this stage. However, if for any reason any insolubles occur as a result of hydrogen peroxide addition, the phosphoric acid solution, at a temperature of at least 60° C., may again be filtered. Thereafter, the phosphoric acid solution is treated to remove any excess hydrogen peroxide that is in solution. This normally is done by air sparging of the treated phosphoric acid, although if a longer period of time is available, the solution can be stirred for a sufficient period to remove the small amount of excess hydrogen peroxide remaining in the phosphoric acid solution. The removal of the excess hydrogen peroxide is necessary to assure that no chemical reactant remains in the phosphoric acid. One of the requirements for SEMI acid is the absence of any "reducing substances" and the presence of reactive substances such as hydrogen peroxide could result in failure of the test.

The resulting acid, after removal of residual hydrogen peroxide, will not exhibit any antimony sulfide precipitate when cool. Further, if the acid is subjected to the standard heavy metal test in which a sample of the acid is treated with added hydrogen sulfide and compared colorimetrically with a standard acid solution containing a given amount of heavy metal (as lead nitrate) along with added hydrogen sulfide, there will be no added antimony insolubles occurring in the treated acid. That is, no antimony sulfide will be precipitated.

An alternate method which can be employed to treat the phosphoric acid for SEMI use, is to first add hydrogen peroxide to the phosphoric acid. The hydrogen peroxide is the same reagent described above in the preferred mode and is added to the phosphoric acid as a 50% to 70% aqueous hydrogen peroxide solution and in amounts sufficient to oxidize the antimony in solution. However, since the hydrogen peroxide in this instance is being added prior to rein moval of any metallic impurities in the phosphoric acid, greater excesses of hydrogen peroxide may have to be employed in this step because some of the hydrogen peroxide reacts with metallic impurities, other than antimony, and is used up in such reactions. In general, a minimum of about 50 ppm, preferably about 50 to 150 ppm of hydrogen peroxide (on a 100% hydrogen peroxide basis) is desirable.

Subsequent to treatment with hydrogen peroxide, the phosphoric acid does not usually have to be filtered since this treatment per se does not usually result in any precipitates being formed at this point. However, if an insoluble impurity does form as a result of some unusual metallic impurity being present in the acid, filtration of the acid at a temperature of at least 60° C. can be carried out subsequent to hydrogen peroxide treatment.

After addition of the hydrogen peroxide and reaction of the peroxide with all of the antimony present in the acid, the excess hydrogen peroxide is rapidly removed from the phosphoric acid solution by sparging with air or other appropriate gases, or the phosphoric acid can be subject to stirring for longer periods of time if desired. It is important that the removal of excess hydrogen peroxide by sparging or by other means be carried out prior to the addition of the next reagent, hydrogen sulfide. Otherwise undesired reaction of the excess hydrogen peroxide can occur with either the hydrogen sulfide reagent or metal sulfides formed as the result of hydrogen sulfide addition. Such reactions would result in the formation of elemental sulfur or in solubilizing heavy metals from their sulfide salts which is most undesired in such SEMI acid.

After removal of all of the excess hydrogen peroxide, the solution is treated with hydrogen sulfide as described above. Sufficient hydrogen sulfide must be added to assure that the maximum amount of metallic impurities, especially the heavy metals, are precipitated as their metal sulfides. The precipitated metal sulfides are then removed from the acid by subjecting it to a separation step, preferably filtration, at a temperature of at least 60° C..

Subsequent to filtration of the phosphoric acid to remove precipitated metal sulfide impurities, the acid is subject to treatment to remove the excess hydrogen sulfide. This is preferably carried out by sparging with air or other suitable gas or by simply allowing the phosphoric acid to stand iith enough agitation for a sufficient time to allow the excess hydrogen sulfide to be removed. The excess hydrogen sulfide is desired to be removed from the acid since otherwise it may fail one of the tests for "reducing substances" which the acid must meet. The presence of residual hydrogen sulfide would make the acid fail this test.

This alternate procedure, while effective, is not as preferred as the first described procedure above, since in the alternate procedure, the initial hydrogen peroxide treatment is carried out before separation of the bulk of the metallic impurities from the acid. Thus, hydrogen peroxide is consumed unnecessarily with other metallic impurities than antimony and is, therefore, wasted. Further, if any $H_2O_2$ remains in solution when the second reactant, hydrogen sulfide, is added to the acid the hydrogen peroxide can react with the metal sulfides formed in solution by $H_2S$ addition and solubilize the heavy metals from their sulfide salts, resulting in metal contamination of the acid.

In the above process, the normal way of separating the precipitated solids from the phosphoric acid is by leaf filters or other filtration techniques. It is possible to utilize centrifuges to carry out separation of the liquid from the solids. However, in practice the use of centrifuges is a less desirable option than the use of filters since separation of all of the precipitated solids from the liquid is more difficult in centrifuges and requires greater care. In the instant process, the precipitated particles must be carefully separated from the remaining acid so as to avoid leaving residual particles in the acid. The presence of even small amounts of such residual particles in the phosphoric acid would render the acid unsuitable for SEMI use since these particles interfere with normal use of the acid on sensitive electronic workpieces.

In the usual specifications for SEMI grade phosphoric acid, the allowable limits for specific heavy metals such as arsenic is only 0.5 ppm maximum. Other metals such as antimony are permitted in amounts up to 20 ppm maximum. There is also a total heavy metals limit of 5 ppm which is permitted under the test In general, the heavy metals test is carried out by colorimetric comparison of a standard with a test sample. The sample is treated with hydrogen sulfide to precipitate heavy metals and other metals such as antimony and this is compared with a standard sample containing measured amounts of lead nitrate which is then treated with hydrogen sulfide in the same manner. The two samples are then compared colorimetrically to ascertain that the heavy metals content of the test sample does not exceed the standard Note that antimony dissolved in the phosphoric acid which is subject to precipitation by hydrogen sulfide will be precipitated by this test and can cause the acid to fail the test. Further, any antimony sulfide which reprecipitates in the acid as a result of coolng of the acid from normal filtration temperatures, even though it does not precipitate as a direct result of adding hydrogen sulfide to the sample in the colorimetric test, nonetheless, can cause the sample to fail the test since such yellow precipitate will show up as an insoluble in the testing procedure.

The following examples are given to illustrate the invention.

EXAMPLE I

Hydrogen sulfide gas was added to 6,000 gallons (22,680 liters) of 85% (by weight) phosphoric acid, maintained at 60° C., through an inline static mixer in amounts in excess required to precipitate metal impurities from the acid solution. About 150 pounds (68.1 kgms) of diatomaceous earth filter aid (Celatom ® FW-14) was mixed into the acid to facilitate filtration, and the acid mixture was filtered while at 60° C. through a vertical, 100 square foot (9.3 m$^2$), pressure leaf filter, precoated with 50 pounds (22.7 kgs) of diatomaceous earth filter aid. The filtered acid was sparged with air for about one hour through a sparge ring in the bottom of the tank containing the acid to strip out excess hydrogen sulfide. Thereafter, about 80 parts per million of hydrogen peroxide (on a 100% $H_2O_2$ basis) comprising two and a half gallons (9.5 liters) of 50% (by weight) aqueous hydrogen peroxide was added to the filtered and sparged acid. After mixing for a few minutes, the acid was sparged with air, through a sparge ring as previously described, to remove excess hydrogen peroxide. No precipitates were formed as the result of the hydrogen peroxide treatment.

The acid, prior to treatment contained 24 ppm antimony and 100 ppm arsenic. The final acid, after treatment, contained 13 ppm of antimony and less than 0.1 ppm arsenic. The acid did not exhibit any precipitation of antimony sulfide on cooling to room temperature (25° C.), and was free of any visible insolubles. Upon being subjected to the colorimetric heavy metals test, the treated acid did not precipitate any antimony sulfide as a result of hydrogen sulfide addition, and passed the test for total heavy metals content. The acid was acceptable for SEMI grade purposes

EXAMPLE II

About 80 parts per million of hydrogen peroxide (on a 100% $H_2O_2$ basis) comprising two and one half gallons (9.5 liters) of 50% (by weight) aqueous hydrogen peroxide was added to 6,000 gallons (22,680 liters) of 85% (by weight) phosphoric acid which was stirred and maintained at 60° C. No precipitates formed as the result of the hydrogen peroxide treatment. The phosphoric acid was allowed to sit with stirring until no excess hydrogen peroxide was detectable. Thereafter, hydrogen sulfide gas was added to the phosphoric acid through an inline static mixer in amounts in excess required to precipitate metal impurities from the acid solution. About 150 pounds (68.1 kgs) of diatomaceous earth filter aid (Celatom ® FW-14) was mixed into the acid to facilitate filtration, and the acid mixture was filtered while at 60° C. through a vertical, 100 square foot (9.3 m²), pressure leaf filter, precoated with 50 pounds (22.7 kgs) of diatomaceous earth filter aid. The acid, filtered from the metal sulfide impurities, was sparged with air through a sparge ring in the bottom of the tank containing the acid to strip out excess hydrogen sulfide.

The final acid, after treatment, contained below 20 ppm of antimony and 0.02 ppm of arsenic. The acid did not exhibit any precipitation of antimony sulfide on cooling to room temperature (25° C). Upon being subjected to the colorimetric heavy metals test, the treated acid did not precipitate any antimony sulfide as a result of hydrogen sulfide addition, and passed the test for total heavy metals content. The acid was acceptable for SEMI grade purposes.

EXAMPLE A

Hydrogen sulfide was added to 6,000 gallons (22,680 liters) of 85% (by weight) phosphoric aiid, which was stirred and maintained at 60° C. The hydrogen sulfide was added through an inline static mixer in amounts in excess of that required to precipitate metal impurities from the acid solution. About 150 pounds (68.1 kgs) of diatomaceous earth filter aid (CelatomR FW-14) was mixed into the acid to facilitate filtration, and the acid mixture was filtered while at 60° C. through a vertical, 100 square foot (9.3 m²), pressure leaf filter, precoated with 50 pounds (22.7 kgs) of diatomaceous earth filter aid. The filtered acid, after cooling to room temperature, was sparged with air for about one hour through a sparge ring in the bottom of the tank containing the acid to strip out the excess hydrogen sulfide.

The filtered acid, treated as set forth above with hydrogen sulfide, but without treatment with hydrogen peroxide, contained 13 ppm of antimony and less than 0.1 ppm of arsenic, comparable with Example I. The recovered acid, at room temperature of 25° C., exhibited a fine, yellow precipitate, identified as antimony sulfide which was not present in the acid after filtration at 60° C.. Upon being subjected to the colorimetric heavy metals test, the fine, yellow precipitate of antimony sulfide caused the sample to fail the heavy metal test.

The above example shows the result of merely sulfiding the phosphoric acid in the absence of hydrogen peroxide treatment. This is the classic problem of post-precipitation of antimony sulfide in the acid upon cooling.

EXAMPLE B

About 80 parts per million of hydrogen peroxide (on a 100% $H_2O_2$ basis) comprising two and one half gallons (9.5 liters) of 50% (by weight) hydrogen peroxide was added to 6,000 gallons (22,680 liters) of 85% (by weight) phosphoric acid, maintained at 60° C. No precipitate formed after the addition of the hydrogen peroxide. The resulting phosphoric acid was not sparged with air or subject to mixing and standing to remove excess hydrogen peroxide. Thereafter, hydrogen sulfide was added to the phosphoric acid, at 60° C., through an inline static mixer in amounts in excess required to precipitate metal impurities from the acid solution. About 150 pounds (68.1 kgs) of diatomaceous earth filter aid (Celatom ® FW-14) was mixed into the acid to facilitate filtration, and the acid mixture was filtered while at 60° C. through a vertical, 100 sguare foot (9.3 m²), pressure leaf filter, precoated with 50 pounds (22.7 kgs) of diatomaceous earth filter aid. The filtered acid was sparged with air for about one hour through a sparge ring in the bottom of the tank containing the acid to strip out excess hydrogen sulfide.

The filtered acid contained about 13 ppm antimony and above 0.5 ppm arsenic. There was no precipitation of antimony sulfide upon cooling of the acid, and the acid passed the colorimetric heavy metals test. However, the arsenic level was too high for use in SEMI grade acid. This was due to the oxidation of sulfide moiety in the acid by the excess hydrogen peroxide remaining in solution, causing some arsenic to redissolve in the solution and not precipitate as arsenic sulfide.

This example demonstrates the need to remove excess hydrogen peroxide from the acid after it has oxidized the antimony, to prevent the excess hydrogen peroxide remaining in the solution from reacting with the sulfide moiety of heavy metal sulfides such as arsenic sulfide to redissolve the arsenic so that it does not precipitate as arsenic sulfide during the hydrogen sulfide addition. The redissolved arsenic

We claim:

1. A process for treating phosphoric acid of about 75% to about 85% concentration as weight percent $H_3PO_4$ containing heavy metals and antimony to make it acceptable for electrical semiconductor use comprising:
   (a) adding to said phosphoric acid a reagent which may be either hydrogen peroxide or hydrogen sulfide, the hydrogen peroxide, when added, being added in amounts sufficient to oxidize residual antimony dissolved in the acid, while the hydrogen sulfide, when added, being added in amounts sufficient to precipitate residual heavy metals in the acid, (b) separating any precipitate resulting from step (a), from the treated acid at a temperature of at least 60° C., (c) removing excess unreacted reagent, either hydrogen peroxide or hydrogen sulfide, from the acid, (d) adding to the resulting phosphoric acid of step (c) the remaining alternate reagent, either hydrogen peroxide or hyrogen sulfide, not employed in step (a); the hydrogen peroxide, when added, being added in amounts sufficient to oxidize residual antimony dissolved in the acid, while the hydrogen sulfide, when added, being added in amounts sufficient to precipitate residual heavy metals in the acid, (e) separating any precipitate resulting from step (d), from the treated acid at a temperature of at least 60° C., (f) removing excess unreacted reagent, either hydrogen peroxide or hydrogen sulfide from the acid, and (g) recovering a phosphoric acid whose heavy metals, antimony, and insolubles content are sufficiently low to be acceptable for electrical semiconductor use.

2. The process of claim 1 wherein the reagent added in step (a) is hydrogen sulfide, the precipitate formed from adding hydrogen sulfide in step (a) is separated in step (b), and hydrogen peroxide is employed in step (d).

3. The process of claim 1 wherein the reagent used in step (a) is hydrogen peroxide, the reagent used in step (d) is hydrogen sulfide and the precipitate resulting from the addition of hydrogen sulfide in step (d) is separated in step (e).

4. The process of claim 1 wherein the separation steps in steps (b) and (d) are carried out at temperatures of from about 60° C. to about 75° C.

5. The process of claim 1 wherein the phosphoric acid has a concentration of about 85%, as weight percent $H_3PO_4$.

6. The process of claim 1 wherein the hydrogen peroxide employed in steps (a) or (d) is an aqueous hydrogen peroxide solution having a concentration of from about 50 to 70 weight pecent, on a 100% $H_2O_2$ basis.

7. The process of cIaim 1 wherein the hydrogen peroxide added in steps (a) or (d) is added in amounts of from about 50 to 150 parts per million to the phosphoric acid.

8. The process of claim 1 wherein the separation steps (b) and (e) are carried out by filtration.

9. The process of claim 1 wherein the step of removing excess unreacted reagent in steps (c) and (f) are carried out by sparging with air.

10. A process for treating phosphoric acid of about 75% to about 85% concentration (as weight percent $H_3PO_4$) containing heavy metals and antimony to make it acceptable for electrical semiconductor use comprising:

(a) adding to said phosphoric acid hydrogen sulfide in amounts sufficient to precipitate residual heavy metals in the acid, (b) separating the precipitate resulting from step (a) at a temperature of least 60° C., (c) removing excess unreacted hydrogen sulfide from the acid, (d) adding to the resulting phosphoric acid of step (c) hydrogen peroxide in amounts sufficient to oxidize residual antimony dissolved in the acid, (e) removing excess unreacted hydrogen peroxide from the acid, and (f) recovering a phosphoric acid whose heavy metals, antimony, and insolubles content are sufficiently low to be acceptable for electrical semiconductor use.

11. The process of claim 10 wherein the phosphoric acid being treated has a concentration of about 85%, as weight percent $H_3PO_4$, the separation of step (b) is carried out by filtration at a temperature of from about 60° C. to about 75° C., the hydrogen peroxide added in step (d) is an aqueous hydrogen peroxide solution of about 50 to about 70 weight percent hydrogen peroxide and is added in amounts of from about 40 to about 150 parts per million.

* * * * *

UNITED STATES PATENT AND TRADEMARK OFFICE
CERTIFICATE OF CORRECTION

PATENT NO. : 4,804,526

DATED : February 14, 1989

INVENTOR(S) : Richard E. Hall, Peter H. Zeh, Frederic B. Jueneman

It is certified that error appears in the above-identified patent and that said Letters Patent is hereby corrected as shown below:

Column 2, line 5, "60oC" should read --60°C--; line 18, "60oC" should read --60°C--; line 53, "tempera-ture" should read --temperature--. Column 3, line 16, "aoid" should read --acid--; line 37, "$H_2O_2$) Lower" should read --$H_2O_2$). Lower--. Column 5, line 4, "rein moval" should read --removal--; line 51, "iith" should read --with--. Column 6, line 24, "the test In general," should read --the test. In general,--; line 34, "standard Note" should read --standard. Note--; line 39, "coolng" should read --cooling--. Column 7, line 5, "Iess" should read --less--; line 13, "purposes" should read --purposes.--; line 50, "aiid," should read --acid,--. Column 8, line 54, "The redissolved arsenic" should read --The redissolved arsenic thereby remains in the solution to contaminate the acid.--. Column 10, line 2, "H2O2" should read --$H_2O_2$--; line 3, "cIaim" should read --claim--; line 35, "H3PO4," should read --$H_3PO_4$,--.

Signed and Sealed this

Fourteenth Day of November, 1989

*Attest:*

JEFFREY M. SAMUELS

*Attesting Officer*     *Acting Commissioner of Patents and Trademarks*